United States Patent

Ohno et al.

[11] Patent Number: 5,179,472
[45] Date of Patent: Jan. 12, 1993

[54] ZOOM LENS

[75] Inventors: Kazunori Ohno; Hitoshi Miyano, both of Omiya, Japan

[73] Assignee: Fuji Photo Optical Co., Ltd., Omiya, Japan

[21] Appl. No.: 719,301

[22] Filed: Jun. 25, 1991

[30] Foreign Application Priority Data

Jun. 25, 1990 [JP] Japan .................... 2-164045
Oct. 20, 1990 [JP] Japan .................... 2-280570

[51] Int. Cl.⁵ .................................. G02B 15/14
[52] U.S. Cl. ........................ 359/687; 359/685
[58] Field of Search ........... 359/676, 683, 687, 708, 359/685

[56] References Cited
U.S. PATENT DOCUMENTS 4,482,218  11/1984  Tanaka ........................ 359/723
4,504,124  3/1985   Imai et al. ................... 359/687

Primary Examiner—Scott J. Sugarman
Attorney, Agent, or Firm—Keck, Mahin & Cate

[57] ABSTRACT

A zoom lens comprises first to fourth lens groups in order from the subject end. Second to third lens groups move along optical axis of the zoom lens for zooming between a wide-angle end where the zoom lens has the shortest focal length and a telephoto end where the zoom lens has the longest focal length. During the zooming, first lens group remains stationary. As the second lens group moves towards the image end for zooming from the wide-angle end to the telephoto end, the third and fourth lens groups are moved so as to initially decrease a relative axial distance therebetween and subsequently increase the axial distance, thereby correcting changes in focus caused by the axial movement of the second lens group during zooming.

40 Claims, 10 Drawing Sheets

INTERMEDIATE
FOCAL LENGTH = 18.592 mm
AXIAL DISTANCE OF MOVEMENT
G2 = 8.0
G3 = 0.5
G4 = -2.97

TELEPHOTO END
FOCAL LENGTH = 42.607 mm
AXIAL DISTANCE OF MOVEMENT
G2 = 12.0
G3 = 0.0
G4 = -0.88

WIDE-ANGLE END

INTERMEDIATE

TELEPHOTO END

WIDE-ANGLE END

INTERMEDIATE

TELEPHOTO END

ZOOM LENS

The present invention relates to a zoom lens and more particularly, to a zoom lens consisting of four lens groups which is short in overall length.

BACKGROUND OF THE INVENTION

1. Field of the Invention

Zoom lenses which have relatively large zoom ratios typically consist of four lens groups, namely, first to fourth lens groups from the object end. Some zoom lenses of this kind are focused by moving the first lens group and are continuously changed in focal length for zooming by moving the second lens group. The third lens group, which is called a compensator, moves relatively to the second lens group so as to correct a change of focus of the zoom lens which is caused by the movement of the second lens group during zooming.

Since the first lens group is generally larger in diameter and heavier in weight than other three lens groups, moving the first lens group of the zoom lens for focusing exerts a great deal of load on a focusing mechanism of the zoom lens. If the zoom lens incorporates an electrically operated automatic focusing device, the first lens group is too heavy to be quickly and smoothly moved by the electrically operated automatic focusing device. For this reason, some zoom lenses of this kind have a second lens group movable for zooming and a fourth lens group movable for correcting a change of focus during zooming. Such a zoom lens is known from, for instance, U.S. Pat. No. 4,256,381, entitled "Zoom Lens," issued Mar. 17, 1981.

On the other hand, some zoom lenses of this kind have second and third lens groups which move relatively to each other for zooming while first and fourth lens groups remain stationary. The fourth lens group consists of two lens elements or a single lens element.

2. Description of Related Art

In a zoom lens having a fourth lens group moving for focusing, focusing the zoom lens on a subject in a range of short subject distances from the zoom lens causes the fourth lens group to travel a long distance. Accordingly, the zoom lens is not only still hard to quickly focus if operated by an electrically operated automatic focusing device but also is unavoidably long in overall length.

A zoom lens utilizing a stationary fourth lens group, consisting of a single lens element, is short in overall length. However, such a zoom lens is insufficient in its aberration correctability, so as to make it difficult to provide an increase in lens speed and zooming ratio. On the other hand, the zoom lens utilizing a stationary fourth lens group consisting of two lens elements is difficult to be made short in overall length.

SUMMARY OF THE INVENTION

The present invention has a primary object to provide a zoom lens of the type consisting of four lens groups with high zoom ratio which is short in overall length.

Another object of the present invention is to provide a zoom lens of the type consisting of four lens groups of which at least the fourth lens group is moved for focusing and which is quickly and smoothly adjusted in focus.

Still another object of the present invention is to provide a zoom lens of the type consisting of four lens groups with high zoom ratio which is small in diameter.

A further object of the present invention is to provide a zoom lens of the type consisting of four lens groups with a high zoom ratio which corrects aberrations well.

For accomplishing the above objects of the invention, according to an embodiment, the zoom lens comprises, in order from the object end, a positive power of first lens means remaining stationary, a negative power of second lens means movable along optical axis of the zoom lens for zooming between a wide-angle end where the zoom lens has the shortest focal length and a telephoto end where the zoom lens has the longest focal length, a positive power of third lens means and a positive power of fourth lens means both of which are movable along the optical axis during zooming. As the second lens means moves towards the image end for a zooming from the wide-angle end to the telephoto end, the third and fourth lens means are moved so as to initially decrease a relative axial distance therebetween and subsequently increase the axial distance while the second negative lens means moves. The third and fourth lens means thus moving correct changes in focus caused by the second lens means during zooming.

Focusing the zoom lens with the third and fourth lens means provides the fourth lens means with an axial movement necessary for focusing smaller than when focusing with the fourth lens only.

According to another embodiment, the zoom lens comprises, in order from the subject end, first to fourth lens means. A positive power of first lens means is movable along an optical axis of the zoom lens for focusing but remains stationary during zooming. A negative power of second lens means, a positive power of third lens means, a positive power of fourth lens means are moved relatively to one another along the optical axis for zooming between the wide-angle end to a telephoto end so as to decreasingly change an axial distance between the second and third lens means. Aperture means is disposed closely to the third lens means between the second and fourth lens means, namely, either before or after the third lens means, and is moved along the optical axis in the same axial direction and distance as the third positive lens means during zooming.

When zooming from the wide-angle end to the telephoto end, the second and third lens means move towards the image end, and with the axial movement of the third lens means, the aperture means moves in the same direction and axial distance as the third lens means. Because the third lens means, moving with the aperture means during zooming, allows the second lens means to move a long axial distance free from at least the aperture means, the zoom lens, with high zoom ratio, is easily designed and adapted to be compact and short in overall length.

BRIEF DESCRIPTION OF THE DRAWINGS

The above and other objects and features of the present invention will be apparent from the following description of a preferred embodiment thereof when considered in conjunction with the accompanying drawings, in which similar reference numerals have been used to designate the same or similar elements throughout the drawings, and wherein.

DETAILED DESCRIPTION OF THE PREFERRED EMBODIMENT

Figure 1:
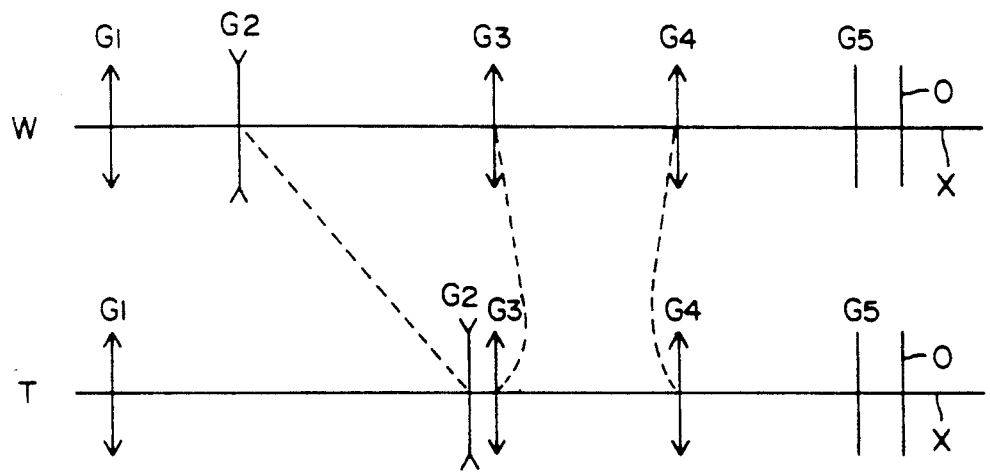
FIG. 1 is a schematic diagrammatical illustration showing a zoom lens in accordance with a preferred embodiment of the present invention.

Referring to the drawings in detail and, particularly, to FIG. 1, the optical system of a zoom lens in accordance with a preferred embodiment of the present invention consists of, in order from the subject end, first, second, third and fourth lens groups G1, G2, G3 and G4, and an optical element, such as a low-pass filter G5 disposed between the fourth lens group G4 and a focal plane O of the zoom lens, which are coaxially arranged with respect to an optical axis X of the zoom lens.

In order for the optical system of the zoom lens to perform a zooming from a wide-angle end, where the zoom lens has the shortest focal length, to a telephoto end, where the zoom lens has the longest focal length or vice versa, the second lens group G2, having a negative refraction power, is moved along the optical axis X towards the focal plane O of the zoom lens. During the zooming, the first lens group G1, having a positive refraction power, remains stationary. On the other hand, in order for the zoom lens to focus on a subject during zooming from the wide-angle end to the telephoto end, the third and fourth lens groups G3 and G4, each having a positive refraction power, are moved correlatively to each other along the optical axis X so as to initially decrease a mutual axial distance therebetween and subsequently increase the mutual axial distance, thereby correcting a change of focus caused by the axial movement of the second lens means.

For zooming from the wide-angle end (indicated by a character W in FIG. 1) to the telephoto end (indicated by a character T in FIG. 1), the second lens group G2 continuously moves along the optical axis X toward the focal plane O so as to increasingly change the focal length from the shortest focal length to the longest focal length. The axial movement of the second lens group G2 is large in distance as compared to movements of any other movable lens groups. During the axial movement of the second lens group G2 for zooming, the third lens group G3 is moved along the optical axis X towards the focal plane O from the wide-angle end and, after the intermediate axial position of the lens group G3 between the wide-angle and telephoto ends, is moved back toward the object end or away from the focal plane O to the telephoto end where the third lens group G3 occupies almost the same axial position as at the wide-angle end. With the axial movement of the third lens group G3 during zooming, the fourth lens group G4 is moved along the optical axis X away from the focal plane O from the wide-angle end and, after the intermediate axial position of the lens group G3 between the wide-angle and telephoto ends, is moved back toward the focal plane O to the telephoto end. The third lens group G3 occupies an axial position at the telephoto end which is the same or almost the same position as the axial position at the wide-angle end. That is, during the zooming of the zoom lens between the wide-angle and telephoto ends, the third and fourth lens groups G3 and G4 are correlatively moved along the optical axis X so as to initially decrease an axial distance therebetween to a minimum axial distance at the intermediate axial positions of the third and fourth lens groups G3 and G4 between the wide-angle and telephoto ends and subsequently decrease the axial distance. It is to be noted that it is not always necessary to move the third lens group G3 continuously towards the focal plane O over the whole range of variation of focal length between the wide-angle and telephoto ends and that, for a subject at an infinite subject distance, the fourth lens group G4 occupies an axial position at the telephoto end which is the same or almost the same position as the axial position at the wide-angle end.

It is desirable to provide at least one of the third and fourth groups G3 and G4 with at least one aspherical surface. The third lens group G3 including at least an aspherical surface permits the zoom lens to be easily designed so as to restrain a change in aberrations, such as spherical aberration and distortion, caused by the axial movement of the second lens group G2 during zooming. On the other hand, the fourth lens group G4, in the case of including at least an aspherical surface, can consist of a less number of lens elements and has well corrected aberrations, such as the curvature of field.

The zoom lens in accordance of the preferred embodiment of the invention is desirably designed to satisfy the following condition:

$$0.29 < |f2|/\sqrt{fw \times ft} < 0.44 \tag{1}$$

where f2 is the focal length of the second lens group G2;

fw is the shortest focal length of the zoom lens; and ft is the longest focal length of the zoom lens.

Condition (1) defines the refraction power of the second lens group G2 (which is referred to as Pr2). The second lens group G2, if having a refraction power smaller than the lower limit of the condition (1), becomes strong in negative refraction power, so as, on one hand, to be desirable in making the zoom lens compact in size, but on the other hand, to cause an increase in negative petzval sum which results in an increased curvature of field of the zoom lens. On the other hand, if having a refraction power larger than the upper limit of the condition (1), the second lens group G2 must have a large distance of movement in order for the zoom lens to provide a required zoom ratio and, therefore, makes the zoom lens large in overall length.

The zoom lens is designed to further satisfy the following condition:

$$0.83 < f3/fw \times \sqrt{ZR} < 2.0 \tag{2}$$

where f3 is the focal length of the third lens group G2; and ZR is the zoom ratio of the zoom lens expressed by ft/fw.

Condition (2) defines the refraction power of the third lens group G3 (which is referred to as Pr3). The zoom lens is overcorrected in spherical aberration if the third lens group G3 has a refraction power larger than the upper limit of the condition (2) or is under-corrected in spherical aberration if the third lens group G3 has a refraction power smaller than the lower limit of the condition (2). In any way, it is hard to correct spherical aberration if the third lens group G3 does not satisfy the condition (2).

Figure 2:
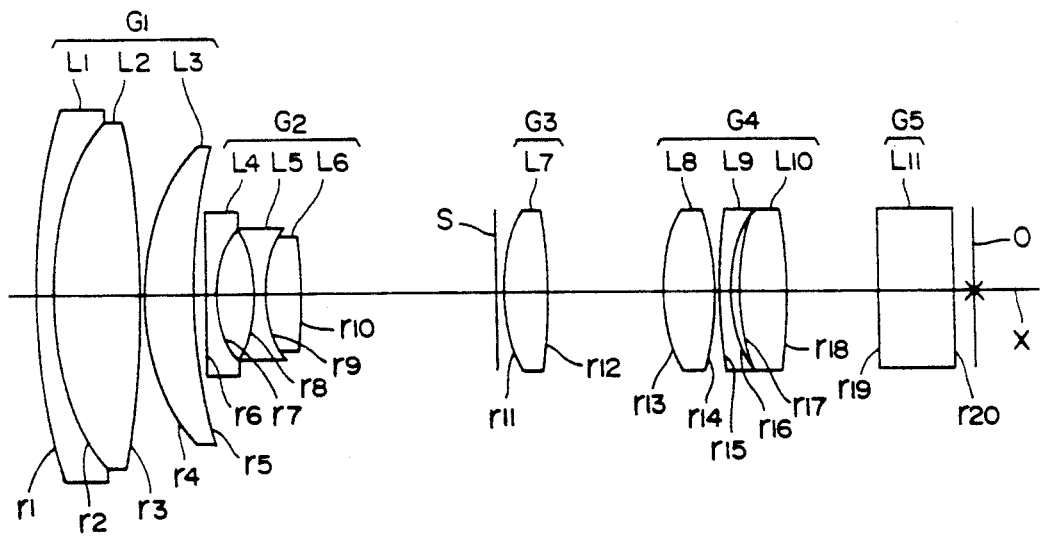
FIG. 2 is a schematic side elevation of a zoom lens of an exemplary form of the zoom lens of FIG. 1.
Figure 4:
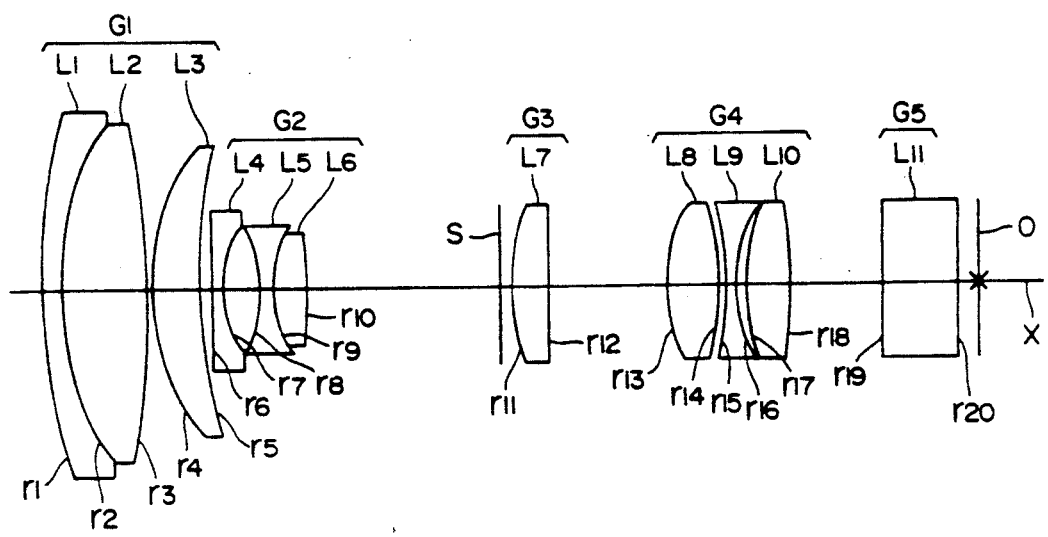
FIG. 4 is a schematic side elevation of a zoom lens of another exemplary form of the zoom lens of FIG. 1.

Examples I and II of the zoom lens in accordance with the preferred embodiment of the present invention are shown in FIGS. 2 and 4 and set forth in Tables I-I and I-II, and II-I and II-II, respectively. In Tables I-I and II-I, r1–r20 identify lens surfaces in order from the subject end and Ne identifies the index of refraction measured by an e-line spectrum.

Aspheric surface is defined as follows:

$$X = [CY^2/(1 + \sqrt{1 - KC^2Y^2})] + A1Y^2 + A2Y^4 + A3Y^6 + A4Y^8$$

where
X is the axial distance;
Y is the height from the axis;
A1–A4 are aspherical coefficients;
C is the reciprocal of a radius of paraxial surface; and
K is an eccentricity.

Tables I-II, I-III, II-II and II-III show data of moved distances of each lens group from a wide-angle end axial position, occupied by the lens group when the zoom lens is adjusted to the wide-angle end (W) to a telephoto end axial position, occupied by the lens group when the zoom lens is adjusted to the telephoto end (T) for a subject at an infinite subject distance and at a subject distance of 1 m. It is to be noted in Tables I-II and II-II that the negative sign (−) indicates a moved distance of lens group toward the image end.

EXAMPLE I

In the first example shown in FIG. 2, the first lens group G1 remains stationary, the second lens group G2 moves toward the focal plane O and the third and fourth lens groups G3 and G4 move together away from and close to each other. The zoom lens is provided with aperture defining means S which remains at a close position to the third lens group G3 between the second and third lens groups G2 and G3. The first lens group G1 consists of three lens elements, namely, a negative power of meniscus lens element L1 having a convex surface toward the subject end and a positive power of bi-convex lens element L2 which are cemented and a positive power of meniscus lens element L3 having a convex surface toward the subject end; the second lens group G2 consists of three lens elements, namely, a negative power of meniscus lens element L4 having a convex surface toward the subject end, a negative power of bi-concave lens element L5 and a positive power of bi-convex lens element L6, the lens elements L5 and L6 being cemented; the third lens group G3 consists of a single lens element, such as a positive power of bi-convex lens element L7; and the fourth lens group G4 consists of three lens elements, namely, a positive power of bi-convex lens element L8, a negative power of meniscus lens element L9 having a convex surface toward the subject end and a positive power of bi-convex lens element L10. The optical element G5 consists of a flat low-pass filter L11.

TABLE I-I

| Lens | Lens Surface | Surface Radius (mm) | Axial Distance Between Surfaces (mm) | Ne |
|---|---|---|---|---|
| L1 | r1 | 44.263 | | |
| | | | 1.10 | 1.81264 |
| | r2 | 20.273 | | |
| L2 | | | 5.47 | 1.59143 |
| | r3 | −70.547 | | |
| | | | 0.20 | |
| | r4 | 15.444 | | |
| L3 | | | 3.36 | 1.59143 |
| | r5 | 44.457 | | |
| | | | M/0.50-T/12.50 | |
| | r6 | 71.425 | | |
| L4 | | | 0.72 | 1.83929 |
| | r7 | 6.965 | | |
| | | | 2.48 | |
| | r8 | −8.291 | | |
| L5 | | | 0.72 | 1.77620 |
| | r9 | 6.279 | | |
| L6 | | | 2.18 | 1.81264 |
| | r10 | −59.579 | | |
| | | | W/13.50-T/1.50 | |
| | r11 | (Asperical) | | |
| L7 | | | 2.50 | 1.59143 |
| | r12 | −83.488 | | |
| | | | W/7.50-T/7.50 | |
| | r13 | (Asperical) | | |
| L8 | | | 3.0 | 1.59143 |
| | r14 | −22.741 | | |
| | | | 0.50 | |
| | r15 | 59.214 | | |
| L9 | | | 0.72 | 1.81264 |
| | r16 | 8.386 | | |
| | | | 0.48 | |
| | r17 | 10.911 | | |
| L10 | | | 2.90 | 1.59143 |
| | r18 | −43.016 | | |
| | | | W/7.80-T/7.80 | |
| | r19 | Infinite | | |
| L11 | | | 6.40 | 1.51825 |
| | r20 | Infinite | | |

| ASPHERICAL COEFFICIENT | |
|---|---|
| Lens Surface: r11 | Lens Surface: r13 |
| C  6.817097 × 10⁻² | 9.048955 × 10⁻² |
| K  9.387801 × 10⁻¹ | −1.02458 |
| A1  0.0 | 0.0 |
| A2  −6.941958 × 10⁻⁵ | −6.088017 × 10⁻⁶ |
| A3  −1.590088 × 10⁻⁶ | −1.647785 × 10⁻⁸ |
| A4  7.273377 × 10⁻⁹ | 3.198951 × 10⁻¹² |

FOCAL LENGTH (mm)

| | | Focal Length of Zoom Lens | | |
|---|---|---|---|---|
| Second lens Group G2 | Third Lens Group G3 | Wide-Angle End (fw) | Telephoto End (ft) | Zoom Ratio (ZR) |
| −5.088 | 21.298 | 5.755 | 42.755 | 7.429 |

In the first example, the zoom lens has the focal length of second lens group G2 of −5.088 mm and the focal length of third lens group G3 of 21.298 mm and, accordingly, refraction powers Pr2 and Pr3 are given as 0.324, which is apparently between 0.29 and 0.44, and 1.358, which is apparently between 0.83 and 2.0, respectively. Table I-II gives axial distances of movement of the second to fourth lens groups G2–G4 in the case the third lens group G3 moves a maximum axial distance of 1 mm and 2 mm.

It is to be noted that the axial distance between the lens surfaces r18 and r19 may be changed according to design demands.

TABLE I-II

| | Second lens Group G2 (mm) | Third Lens Group G3 (mm) | Fourth Lens Group G4 (mm) | |
|---|---|---|---|---|
| | | | SD = ∞ | SD = 1 m |
| A: Maximum Movement of Third Lens Group G3 = 1 mm | | | | |
| Wide-Angle End (W) | 0.0 | 0.0 | 0.0 | −0.02 |
| Point A | 6.0 | 0.5 | −2.16 | −2.32 |
| Point B | 8.0 | 1.0 | −2.43 | −2.74 |
| Point C | 10.0 | 1.0 | −2.23 | −2.91 |
| Telephoto End (T) | 12.0 | 0.0 | 0.0 | −1.71 |
| B: Maximum Movement of Third Lens Group G3 = 2 mm | | | | |
| Wide-Angle End (W) | 0.0 | 0.0 | 0.0 | −0.02 |
| Point A | 6.0 | 1.0 | −1.83 | −1.98 |
| Point B | 8.0 | 2.0 | −1.75 | −2.02 |
| Point C | 10.0 | 2.0 | −1.58 | −2.17 |
| Telephoto End (T) | 12.0 | 0.0 | 0.0 | −1.71 |

The following Table I-III gives data of axial distances of lens movement of conventional four lens group type of zoom lenses: in Prior Art I, the third lens group moves as compensator lens means while the fourth lens group remains stationary; and in Prior Art II, the fourth lens group moves to focus on a subject at an infinite subject distance and at a subject distance of 1 m, while the third lens group remains stationary.

TABLE I-III

| | Second lens Group (mm) | Third Lens Group (mm) | Fourth Lens Group (mm) | |
|---|---|---|---|---|
| | | | SD = ∞ | SD = 1 m |
| Prior Art I | | | | |
| Wide-Angle End (W) | 0.0 | 0.0 | — | — |
| Point A | 6.0 | 4.64 | — | — |
| Point B | 8.0 | 5.54 | — | — |
| Point C | 10.0 | 5.25 | — | — |
| Telephoto End (T) | 12.0 | 0.0 | — | — |
| Prior Art II | | | | |
| Wide-Angle End (W) | 0.0 | — | −0.0 | −0.02 |
| Point A | 6.0 | — | −2.51 | −2.69 |
| Point B | 8.0 | — | −3.22 | −3.59 |
| Point C | 10.0 | — | −2.98 | −3.79 |
| Telephoto End (T) | 12.0 | — | 0.0 | −1.71 |

Moved distances of the fourth lens group G4 for focusing shown in Table I-II (A) and (B) are for the cases that the third lens group G3 moves the maximum distances of 1 mm and 2 mm towards the image end, respectively, while the second lens group G2 moves continuously toward the image end from the wide-angle end (W) to the telephoto end (T) for zooming. When the zoom lens is focused at an object distance of 1 m, the moved distance of the fourth lens group G4 is 2.91 mm at the maximum distance of 1 mm of the third lens group G3 or 2.17 mm at the maximum distance of 2 mm of the third lens group G3. As compared with the moved distances of the third lens group G3 of the present invention, it can be said that the axial distance of movement of the third lens group G3 used as the compensator lens means in Table I-III, Prior Art I, wherein the second lens group G2 moves continuously from the wide-angle end (W) to the telephoto end (T) for zooming, is considerably large. On the other hand, as compared with the moved distances of the fourth lens group G4 of the present invention, it can be also said that the axial distance of movement of the fourth lens group G4, in Table I-III, Prior Art II, wherein the second lens group G2 moves continuously from the wide-angle end (W) to the telephoto end (T) for zooming and the third lens group remains stationary, is large. In addition, it is apparent that the movement of the fourth lens group G4 is reduced by 0.88 mm to 1.62 mm, which is substantially 23 to 43% of reduction, relative to Prior Art II by the aid of restricting the maximum moved distance of the third lens group G3 to 1.0 mm to 2.0 mm.

Figure 3A:
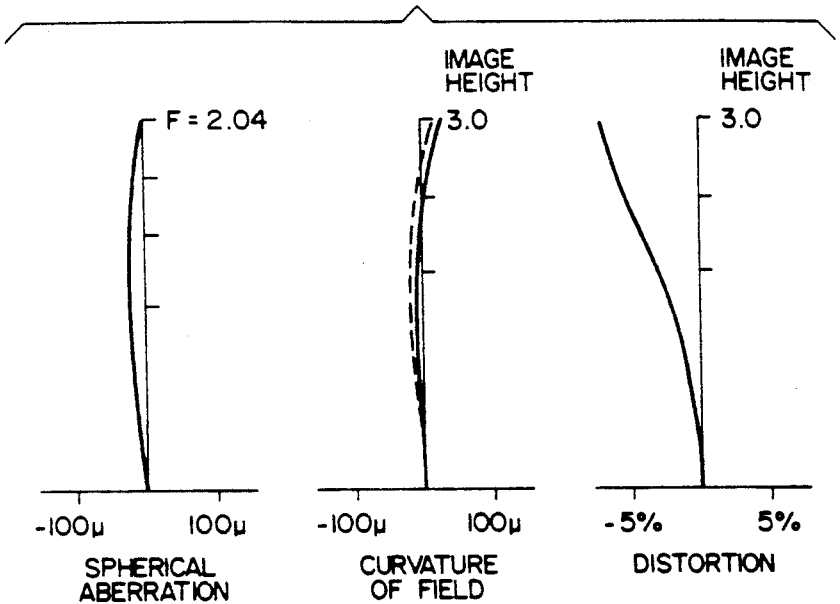
FIGS. 3A to 3C are graphs of aberration curves of the zoom lens of FIG. 2.
Figure 3B:
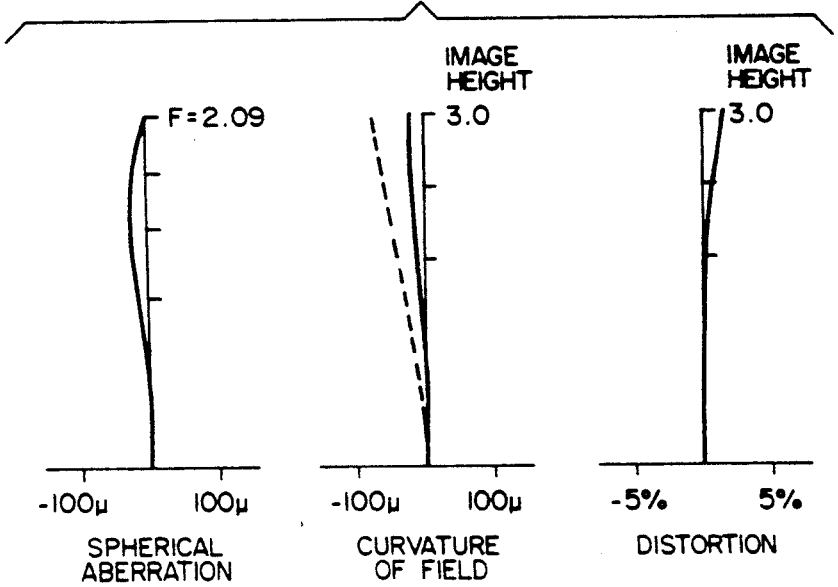
Figure 3C:
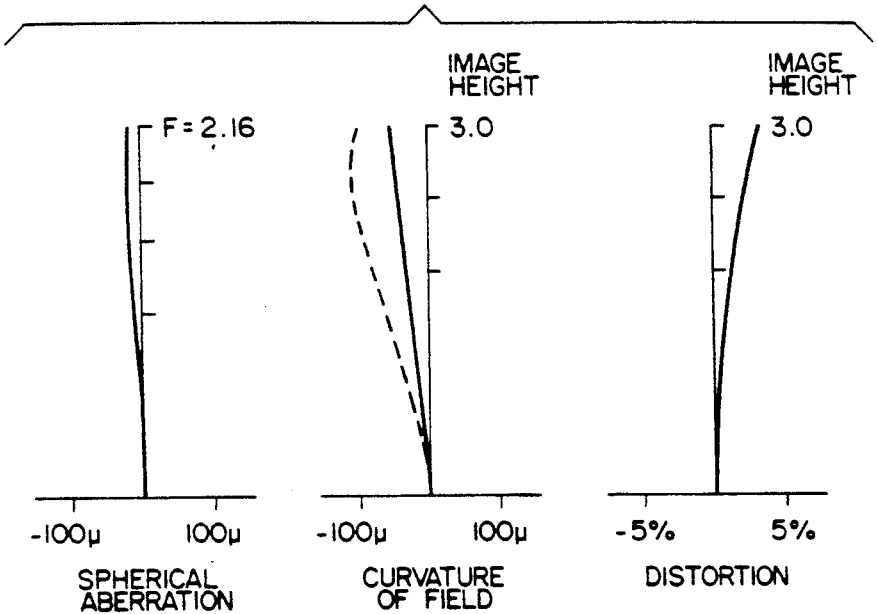

FIGS. 3A to 3C show aberration curves, such as spherical aberration, curvature of field and distortion, of the zoom lens set forth in Table I-II(A) at focal lengths of 5.755 mm (wide-angle end), 18.020 mm (point B) and 42.572 mm (telephoto end), respectively, when the zoom lens is focused at a subject distance of 2 m.

EXAMPLE II

In the second example shown in FIG. 4, the first lens group G1 consists of three lens elements, namely a cemented lens of a negative power of meniscus lens element L1 having a convex surface toward the object end and a positive power of bi-convex lens element L2 and a positive power of meniscus lens element L3 having a convex surface toward the object end; the second lens group G2 consists of three lens elements, namely a negative power of meniscus lens element L4 having a convex surface toward the object end and a cemented lens of a negative power of bi-concave lens element L5 and a positive power of bi-convex lens element L6; the third lens group G3 consists of a single lens element, such as a positive power of flat-convex lens element L7 having an aspherical surface convex to the object end; and the fourth lens group G4 consists of three lens elements, namely a positive power of bi-convex lens element L8, a negative power of bi-concave lens element L9 and a positive power of bi-convex lens element L10 having an aspherical surface convex to the object end. The optical element G5 consists of a flat low-pass filter L11.

TABLE II-I

| Lens | Lens Surface | Surface Radius (mm) | Axial Distance Between Surfaces (mm) | Ne |
|---|---|---|---|---|
| L1 | r1 | 41.616 | | |
| | | | 1.10 | 1.81264 |
| L2 | r2 | 19.942 | | |
| | | | 5.52 | 1.59143 |
| | r3 | −73.124 | | |
| | | | 0.20 | |
| L3 | r4 | 15.998 | | |
| | | | 3.26 | 1.59143 |
| | r5 | 47.910 | | |
| | | | W/0.50-T/12.50 | |
| L4 | r6 | 71.416 | | |
| | | | 0.72 | 1.83929 |
| | r7 | 7.072 | | |
| | | | 2.38 | |
| L5 | r8 | −8.842 | | |
| | | | 0.72 | 1.77620 |
| | r9 | 5.910 | | |
| L6 | | | 2.22 | 1.81264 |
| | r10 | −134.696 | | |
| | | | W/13.50-T/1.50 | |
| L7 | r11 | (Asperical) | | |
| | | | 2.50 | 1.59143 |
| | r12 | Infinite | | |
| | | | W/7.50-T/7.50 | |
| L8 | r13 | 9.862 | | |
| | | | 3.0 | 1.67341 |
| | r14 | −20.847 | | |
| | | | 0.50 | |
| L9 | r15 | −19.857 | | |
| | | | 0.72 | 1.81264 |
| | r16 | 10.744 | | |

TABLE II-I-continued

| | | | 0.48 | |
|---|---|---|---|---|
| L10 | r17 | (Aspherical) | | |
| | | | 2.90 | 1.59143 |
| | r18 | −17.061 | | |
| | | | W/7.80-T/7.80 | |
| | r19 | Infinite | | |
| L11 | | | 6.40 | 1.51825 |
| | r20 | Infinite | | |

| ASPHERICAL COEFFICIENT | |
|---|---|
| Lens Surface: r11 | Lens Surface: r17 |
| C    7.904201 × 10$^{-2}$ | 8.061396 × 10$^{-2}$ |
| K    1.065024 | 7.464477 × 10$^{-1}$ |
| A1   0.0 | 0.0 |
| A2   −8.679398 × 10$^{-5}$ | −3.876448 × 10$^{-4}$ |
| A3   −1.563098 × 10$^{-7}$ | −1.517197 × 10$^{-7}$ |
| A4   7.274023 × 10$^{-9}$ | −2.053923 × 10$^{-8}$ |

FOCAL LENGTH (mm)

| | | Total Focal Length of Zoom Lens | | |
|---|---|---|---|---|
| Second lens Group G2 | Third Lens Group G3 | Wide-Angle End (fw) | Telephoto end (ft) | Zoom Ratio (ZR) |
| −5.048 | 21.391 | 5.687 | 42.753 | 7.518 |

In the second example, the zoom lens has the focal length of second lens group G2 of −5.048 mm and the focal length of third lens group G3 of 21.391 mm, and accordingly, refraction powers Pr2 and Pr3 are given as 0.324, which is apparently between 0.29 and 0.44, and 1.372, which is apparently between 0.83 and 2.0, respectively. It is to be noted that the axial distance between the lens surfaces r18 and r19 may be changed according to design demands.

TABLE II-II

| | Second lens Group G2 (mm) | Third Lens Group G3 (mm) | Fourth Lens Group G4 (mm) | |
|---|---|---|---|---|
| | | | SD = ∞ | SD = 1 m |
| A: Maximum Movement of Third Lens Group G3 = 0.5 mm | | | | |
| Wide-Angle End (W) | 0.0 | 0.0 | 0.0 | −0.03 |
| Point A | 6.0 | 0.5 | −2.15 | −2.31 |
| Point B | 8.0 | 0.5 | −2.80 | −3.14 |
| Point C | 10.0 | 0.5 | −2.59 | −3.33 |
| Telephoto End (T) | 12.0 | 0.0 | 0.0 | −1.71 |
| B: Maximum Movement of Third Lens Group G3 = 1 mm | | | | |
| Wide-Angle End (W) | 0.0 | 0.0 | 0.0 | −0.03 |
| Point A | 6.0 | 1.0 | −1.82 | −1.97 |
| Point B | 8.0 | 1.0 | −2.42 | −2.73 |
| Point C | 10.0 | 1.0 | −2.23 | −2.91 |
| Telephoto End (T) | 12.0 | 0.0 | 0.0 | −1.71 |

The following Table II-III gives data of axial distances of movement of a conventional four lens group type of zoom lens: in Prior Art I, the third lens group moves as compensator lens means, while the fourth lens group remains stationary; in Prior Art I, the fourth lens group moves to focus on a subject at an infinite subject distance and at a subject distance of 1 m, while the third lens group remains stationary.

TABLE II-III

| | Second lens Group (mm) | Third Lens Group (mm) | Fourth Lens Group (mm) | |
|---|---|---|---|---|
| | | | SD = ∞ | SD = 1 m |
| Prior Art I | | | | |
| Wide-Angle End (W) | 0.0 | 0.0 | — | — |
| Point A | 6.0 | 4.63 | — | — |
| Point B | 8.0 | 5.53 | — | — |
| Point C | 10.0 | 5.25 | — | — |
| Telephoto End (T) | 12.0 | 0.0 | — | — |
| Prior Art II | | | | |
| Wide-Angle End (W) | 0.0 | — | 0.0 | −0.03 |
| Point A | 6.0 | — | −2.50 | −2.67 |
| Point B | 8.0 | — | −3.20 | −3.57 |
| Point C | 10.0 | — | −2.97 | −3.79 |
| Telephoto End (T) | 12.0 | — | 0.0 | −1.71 |

Figure 5A:
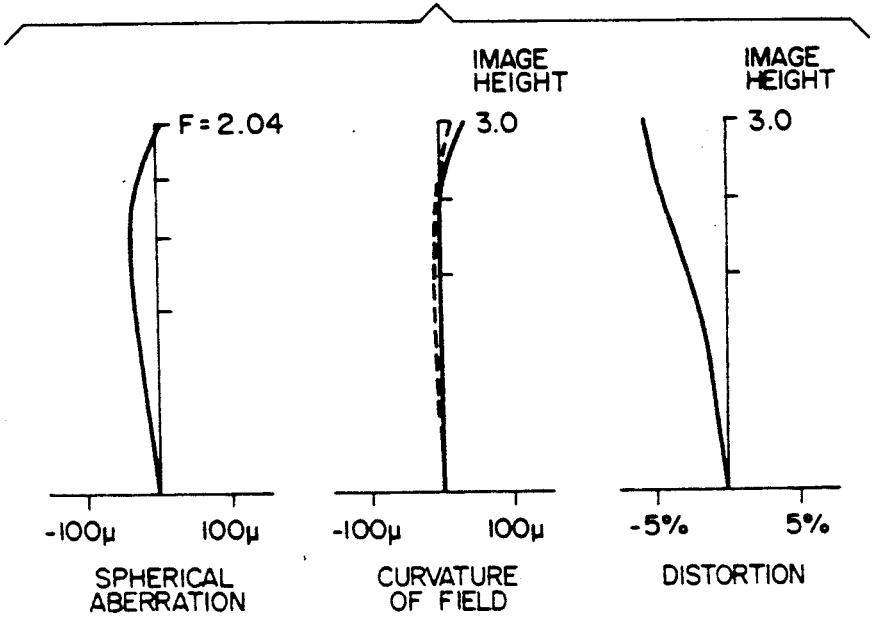
FIGS. 5A to 5C are graphs, similar to FIGS. 3A to 3C, of aberration curves of the zoom lens of FIG. 4.
Figure 5B:
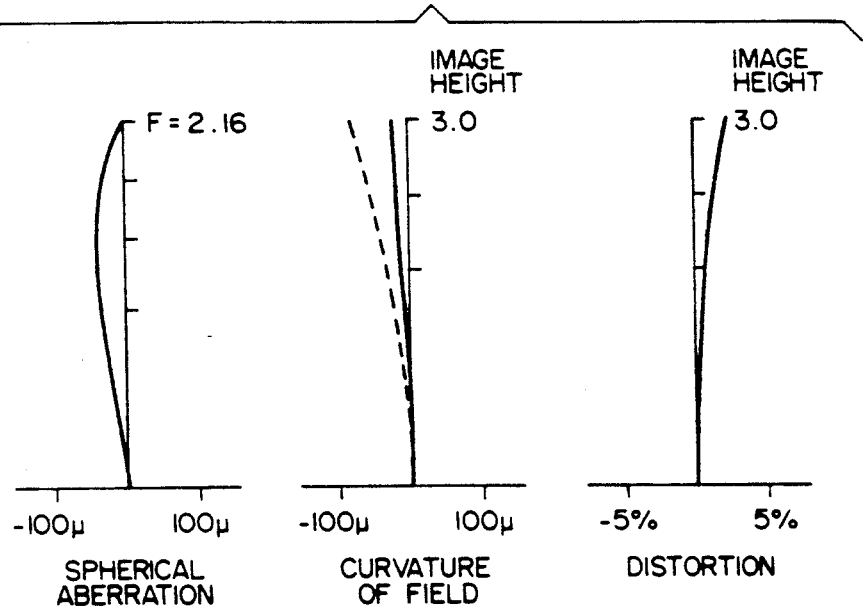
Figure 5C:
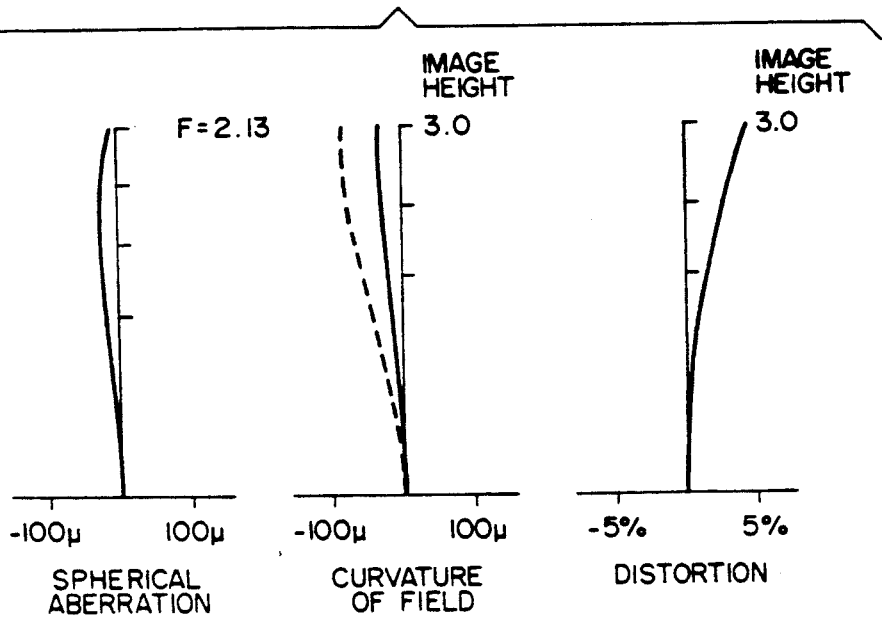

FIGS. 5A to 5C show aberration curves, such as spherical aberration, curvature of field and distortion, of the zoom lens set forth in Table II-II(A) at focal lengths of 5.686 mm (wide-angle end), 18.592 mm (point B) and 42.607 mm (telephoto end), respectively, when the zoom lens is focused at an object distance of 2 m.

The aberrations in FIGS. 3A-3C and 5A-5C are sufficiently small to make the zoom lens of the present invention useful for practical applications.

Figure 6:
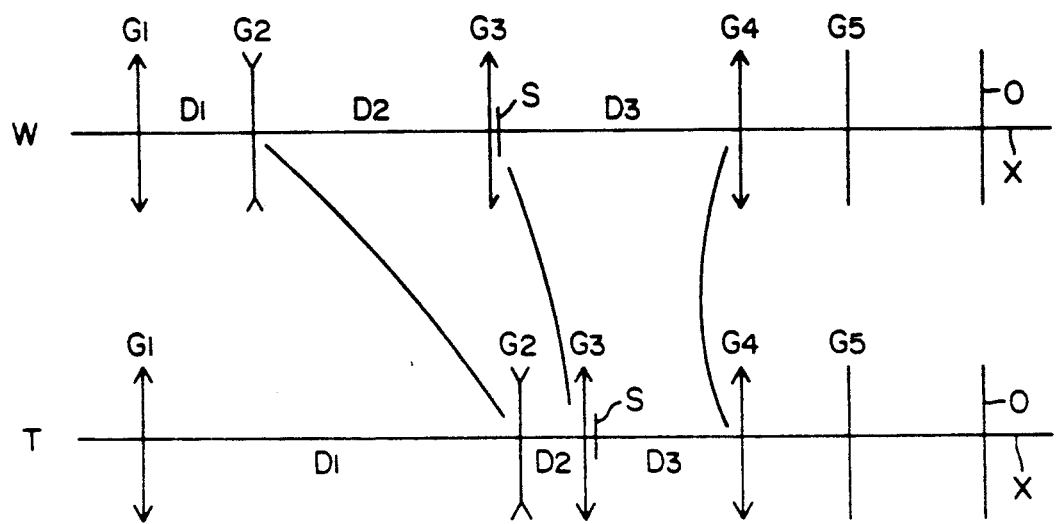
FIG. 6 is a schematic diagrammatical illustration showing a zoom lens in accordance with another preferred embodiment of the present invention.

Referring to FIG. 6, a zoom lens in accordance with another preferred embodiment of the present invention is shown, consisting of four lens groups, namely, first, second, third and fourth lens groups G1, G2, G3 and G4, in order from the subject end, and an optical element, such as a low-pass filter G5, disposed between the fourth lens group G4 and a focal plane O of the zoom lens, all of which are coaxial with respect to an optical axis X of the zoom lens. Aperture means S, disposed closely to the third lens group G3 between the second and fourth lens groups G2 and G4, namely either between the second and third lens groups G2 and G3 or between the third and fourth lens groups G3 and G4, moves along with and in the same direction as the third lens group G3.

During zooming, the first lens group G1, having a positive refraction power, remains stationary. However, for focusing in the whole range of zooming between the wide-angle end (W) to the telephoto end (T), the first lens group G1 is moved along the optical axis X.

For zooming from the wide-angle end (W) where the zoom lens has the shortest focal length to the telephoto end (T) where the zoom lens has the longest focal length, the second lens group G2, third lens group G3 and fourth lens group G4, having, respectively, a negative, a positive, and a positive refraction power, relatively move along the optical axis X. In particular, during the zooming of the zoom lens from the wide-angle end (W) to the telephoto end (T), the second and third lens groups G2 and G3 are correlated with each other to move in the same direction towards the focal plane O so as to decreasingly change an axial distance therebetween. The fourth lens group G4, correlated with the third lens group G3, moves initially towards the subject end or away from the focal plane Q and subsequently towards the focal plane so as to initially decrease an axial distance between the third and fourth lens groups G3 and G4 and subsequently increase the axial distance.

During zooming between the wide-angle end (W) and the telephoto end (T), the aperture means S moves the same axial distance and in the same axial direction as the third lens group G3 moves. If the aperture means S is disposed closely before the second lens group G2 and moves along with the second lens group G2, off-paraxial ray entering into the fourth lens group G4 becomes higher in height as the angle of view of the zoom lens becomes large in angle and the difference of off-paraxial ray between the wide-angle range and the telephoto range becomes large, so that the zoom lens becomes difficult in restraining changes of aberrations, such as the curvature of field and distortions. On the other hand, disposing the aperture means S closely after the fourth lens group and moving it along with the fourth lens group makes it unavoidable for off-paraxial ray entering into the first lens group G1 to become higher as the angle of view of the zoom lens becomes large in angle, resulting in providing a zoom lens with a large diameter of first lens group G1 which affects compactness of the zoom lens. Further, it may be considered to stationary dispose the aperture means either between the second and third lens groups G2 and G3 or between the third and fourth lens groups G3 and G4; however, the aperture means S remaining stationary between two moving lens groups G2 and G3 or G3 and G4 causes difficulties in operation mechanism of the zoom lens.

Disposing the aperture means S closely before or after the third lens group G3 and moving it along with the third lens group G3 permits the zoom lens to be made compact and to have a decreased change in aberrations.

In order for the zoom lens to decrease the total number of lens elements, it is desirable to provide at least one of the third and fourth groups G3 and G4 with at least one aspherical surface. This is because zoom lenses of this kind generally have approximately twelve to thirteen lens elements, and such a large number of lens elements is unfavorable to a recent zoom lens design demand in which a simple structure and a low manufacturing cost are essential. The third lens group G3, when it consists of a single lens element, should have an aspherical surface in order for the zoom lens of the present invention to provide a decreased change in aberrations. The third lens group G3, including an aspherical surface, correctly decreases aberrations, such as spherical aberrations and distortions, of the zoom lens. The fourth lens group G4, including an aspherical surface, provides the zoom lens with a well corrected curvature of field.

Because, the zoom lens of this embodiment of the present invention causes the second and third lens groups G2 and G3 to move so as to decreasingly change the relative axial distance therebetween from the wide-angle end to the telephoto end and so as to locate, at the telephoto end, the second lens group G2 with its center of axial distance behind the axial position that the center of axial distance of the third lens group G3 occupies at the wide-angle end, the zoom lens is short in overall length as compared with the conventional zoom lenses and provides a high zoom ratio approximately up to a magnification of ×8. It is to be noted that the third lens group G3 may be moved towards the subject near the telephoto end according to the demand of aberration correction and zoom ratio.

The zoom lens in accordance of the other preferred embodiment of the invention is desirably designed to satisfy the following condition:

$$2.5 < f_3/f_w < 4.5 \quad (3)$$

where
$f_3$ is the focal length of the third lens group G3; and
$f_w$ is the shortest focal length of the zoom lens.

The third lens group G3, if having a refraction power smaller than the lower limit of the condition (3), becomes strong in positive refraction power while the fourth lens group G4 has a weak negative refraction power which is favorable to aberration correction. It is hard to make such a third lens group consist of a single lens element. Additionally, if having a refraction power smaller than the lower limit of the condition (3), the axial movement of the third and fourth lens groups G3 and G4 during zooming becomes large, resulting in a difficulty of operation mechanism. On the other hand, if having a refraction power larger than the upper limit of the condition (3), the fourth lens group G4 becomes strong in refraction power, resulting in the difficulty of aberration correction with a less number of lens elements of the fourth lens group G4.

Figure 7:
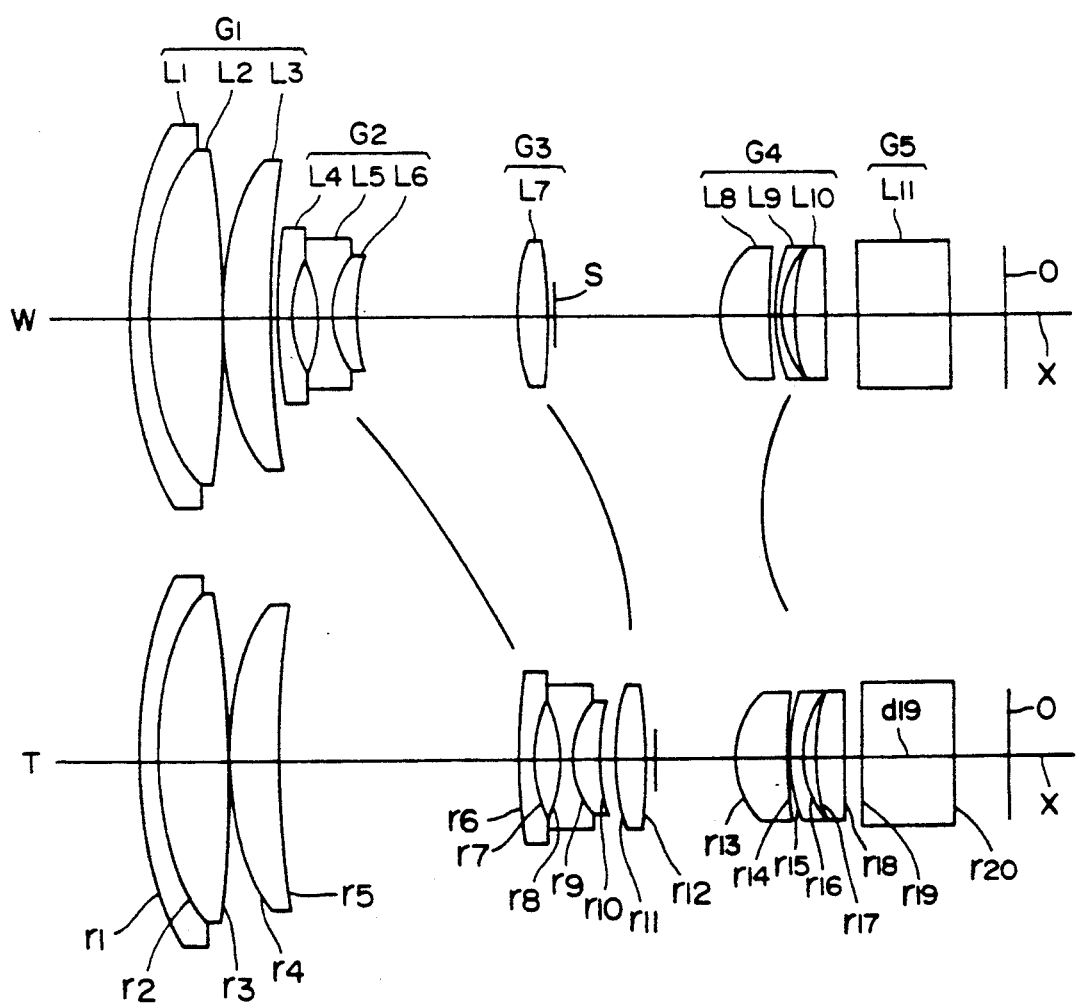
FIG. 7 is a schematic side elevation of a zoom lens of an exemplary form of the zoom lens of FIG. 1.
Figure 9:
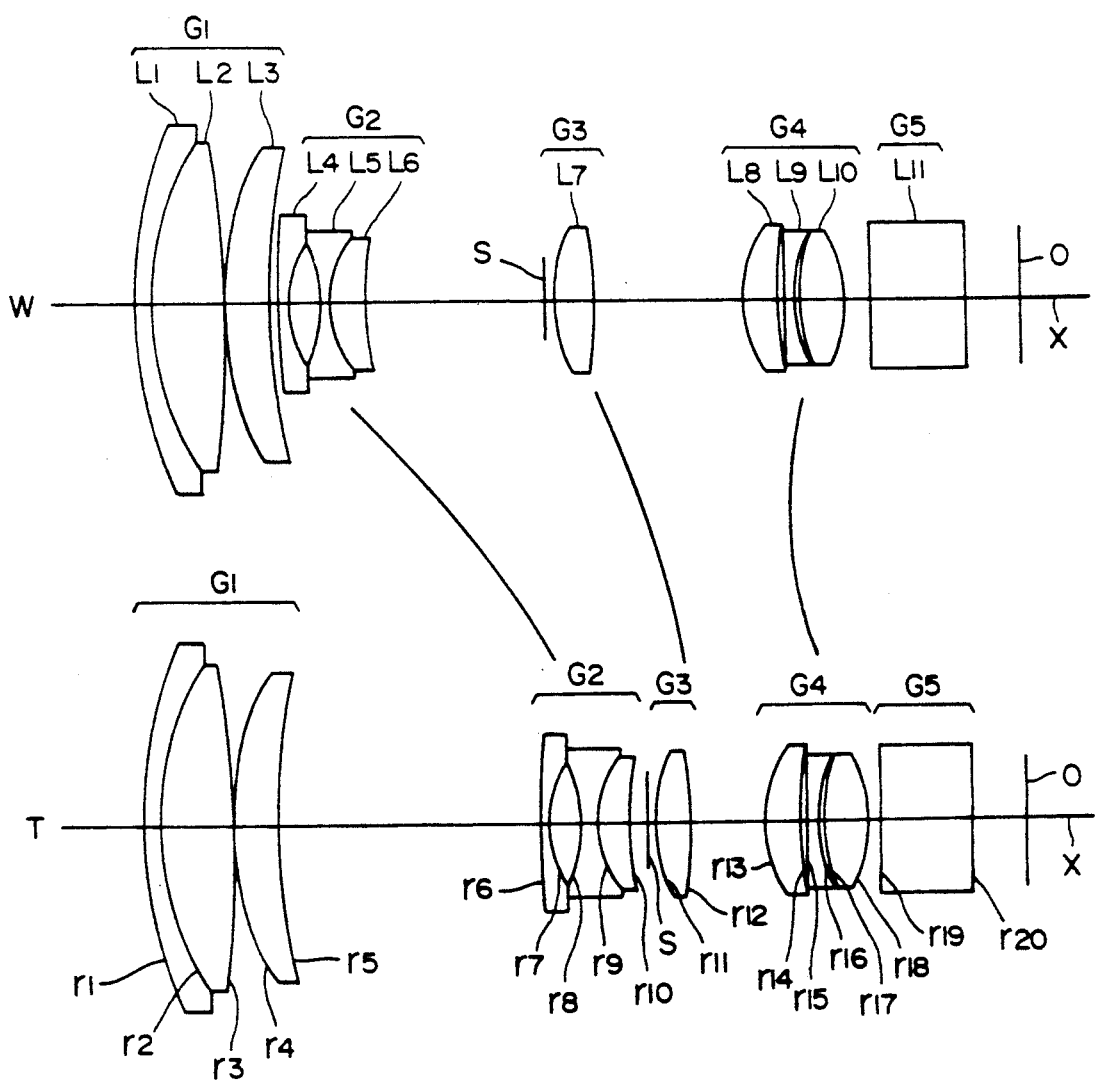
FIG. 9 is a schematic side elevation of a zoom lens of another exemplary form of the zoom lens of FIG. 1.

Examples III and IV of the zoom lens in accordance with the other preferred embodiment of the present invention are shown in FIGS. 7 and 9 and set forth in Tables III and IV, respectively. In Tables III and IV, r1–r20 identify lens surfaces in order from the subject end, and Nd and Vd, respectively, identify the index of refraction measured by a d-line spectrum and Abbe Number.

Aspheric surface is defined as follows:

$$X = [CY^2/(1 + \sqrt{1 - KC^2Y^2})] + A1Y^2 + A2Y^4 + A3Y^6 + A4Y^8$$

where
X is the axial distance;
Y is the height from the axis;
A1–A4 are aspherical coefficients;
C is the reciprocal of a radius of paraxial surface; and
K is an eccentricity.

EXAMPLE III

In the first example, the first lens group G1 consists of three lens elements, namely a negative power of meniscus lens element L1 having a convex surface toward the subject end, a positive power of bi-convex lens element L2, and a positive power of meniscus lens element L3 having a convex surface toward the subject end; the second lens group G2 consists of three lens elements, namely a negative power of meniscus lens element L4 having a convex surface toward the subject end, a negative power of bi-concave lens element L5 and a positive power of meniscus lens element L6 having a convex surface toward the subject end, the lens elements L5 and L6 being cemented; the third lens group G3 consists of a single lens element, such as a positive power of bi-convex lens element L7; and the fourth lens group G4 consists of three lens elements, namely a positive power of meniscus lens element L8, a negative power of meniscus lens element L9 having a convex surface toward the subject end, and a positive power of bi-convex lens element L10. The optical element G5 consists of a flat lowpass filter L11.

TABLE III

| Lens | Lens Surface | Surface Radius (mm) | Axial Distance Between Surfaces (mm) | Nd | Vd |
|---|---|---|---|---|---|
| L1 | r1 | 29.053 | | | |
| | | | 1.20 | 1.84666 | 23.9 |
| | r2 | 19.787 | | | |

TABLE III-continued

| Lens | | Surface Radius (mm) | Axial Distance Between Surfaces (mm) | Nd | Vd |
|---|---|---|---|---|---|
| L2 | | | 5.00 | 1.48749 | 70.4 |
| | r3 | −108.170 | | | |
| | | | 0.07 | | |
| | r4 | 18.355 | | | |
| L3 | | | 3.60 | 1.48749 | 70.4 |
| | r5 | 51.330 | | | |
| | | | W/0.48-M/9.19-T/16.59 | | |
| | r6 | 54.638 | | | |
| L4 | | | 0.72 | 1.71300 | 53.9 |
| | r7 | 7.779 | | | |
| | | | 1.90 | | |
| | r8 | −12.623 | | | |
| L5 | | | 0.72 | 1.75896 | 50.4 |
| | r9 | 5.489 | | | |
| L6 | | | 1.80 | 1.80518 | 25.5 |
| | r10 | 23.536 | | | |
| | | | W/10.96-M/5.93-T/1.20 | | |
| | r11 | 15.541 | | | |
| L7 | | | 2.04 | 1.51823 | 59.0 |
| | r12 | −66.166 | | | |
| | | | W/11.690-M/5.58-T/6.25 | | |
| | r13 | 5.995 | | | |
| L8 | | | 3.60 | 1.48749 | 70.4 |
| | r14 | 43.943 | | | |
| | | | 0.06 | | |
| | r15 | 10.366 | | | |
| L9 | | | 0.66 | 1.84666 | 23.9 |
| | r16 | 5.269 | | | |
| | | | 0.94 | | |
| | r17 | 10.629 | | | |
| L10 | | | 2.40 | 1.77250 | 49.6 |
| | r18 | −155.680 | | | |
| | | | W/1.0-M/1.0-T/1.0 | | |
| | r19 | Infinite | | | |
| L11 | | | 6.40 | 1.51633 | 64.1 |
| | r20 | Infinite | | | |

| ASPHERICAL COEFFICIENT | | |
|---|---|---|
| | Lens Surface: r11 | Lens Surface: r13 |
| C | 0.064346 | 0.166794 |
| K | 0.994157 | 0.339525 |
| A1 | 0.0 | 0.0 |
| A2 | $-9.8228 \times 10^{-5}$ | $1.08899 \times 10^{-4}$ |
| A3 | $-5.3973 \times 10^{-7}$ | $4.53960 \times 10^{-6}$ |
| A4 | $-7.1375 \times 10^{-10}$ | $-1.08032 \times 10^{-8}$ |

| FOCAL LENGTH DATA | | |
|---|---|---|
| | Focal Length (mm) | Back Focal Length |
| Wide-Angle End (fw) | 6.186 | 5.048 |
| Intermediate (fi) | 16.271 | 7.480 |
| Telephoto end (ft) | 47.238 | 4.145 |

In the example III, since the zoom lens has the third lens group G3 whose focal length f3 is 24.493 mm and the ratio of f3/fw is 3.9595, the condition (3) is apparently cleared. The overall length of zoom lens system is 60.293 mm. The telephoto ratio of the zoom lens, which is defined by a ratio of the focal length of the telephoto end to the overall length, is 1.2764. It is to be noted that the axial distance between the lens surfaces r18 and r19 may be changed according to design demands.

In the zoom lens, focusing is performed by moving the lens elements L8–L10 of the fourth lens group G4 as one whole. Otherwise, the zoom lens may be constituted so as to perform focusing by either moving the first lens group G1 only or moving the first lens group G1 and the fourth lens group G4 as one whole. In the case of moving the lens elements L8–L10 as one whole for focusing, the first lens group G1 is made smaller in diameter than in the case of moving the first lens group G1.

Forming the single lens element L7 of the third lens group G3 with an aspherical surface r11 provides an improvement of aberrations, such as spherical aberration and distortions, of the zoom lens. Forming the first lens element L8 of the fourth lens group G4 with an aspherical surface r13 provides an improvement of aberrations, such as the curvature of field, of the zoom lens. These lens elements L7 and L10 having aspherical surfaces, although preferably made of glass, may be made of plastics.

Figure 8A:
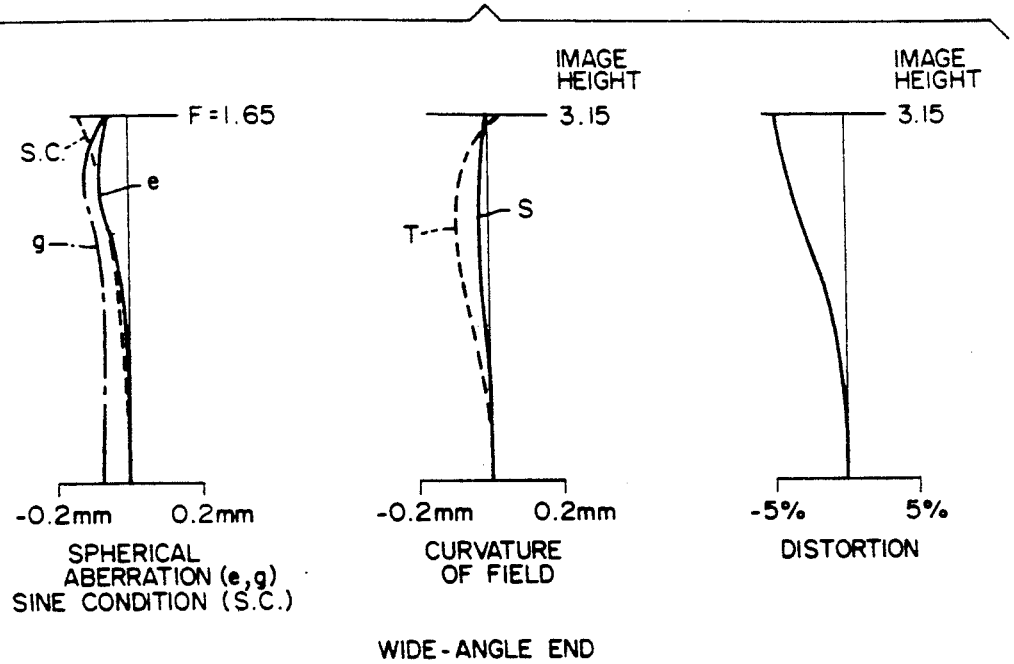
FIGS. 8A to 8C are graphs of aberration curves of the zoom lens of FIG. 7.
Figure 8B:
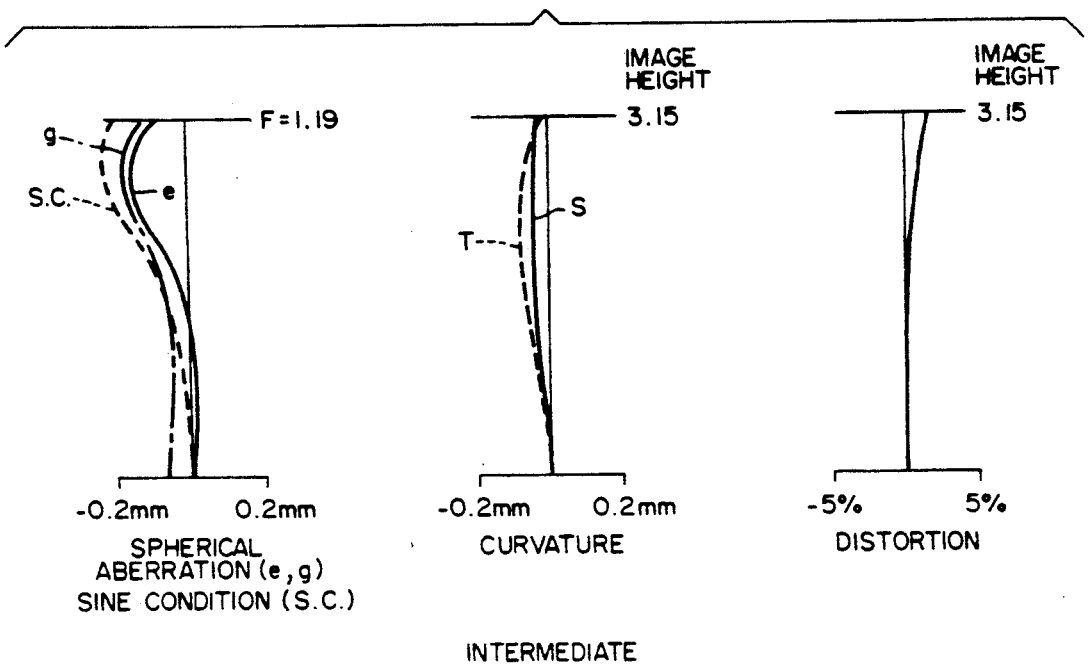
Figure 8C:
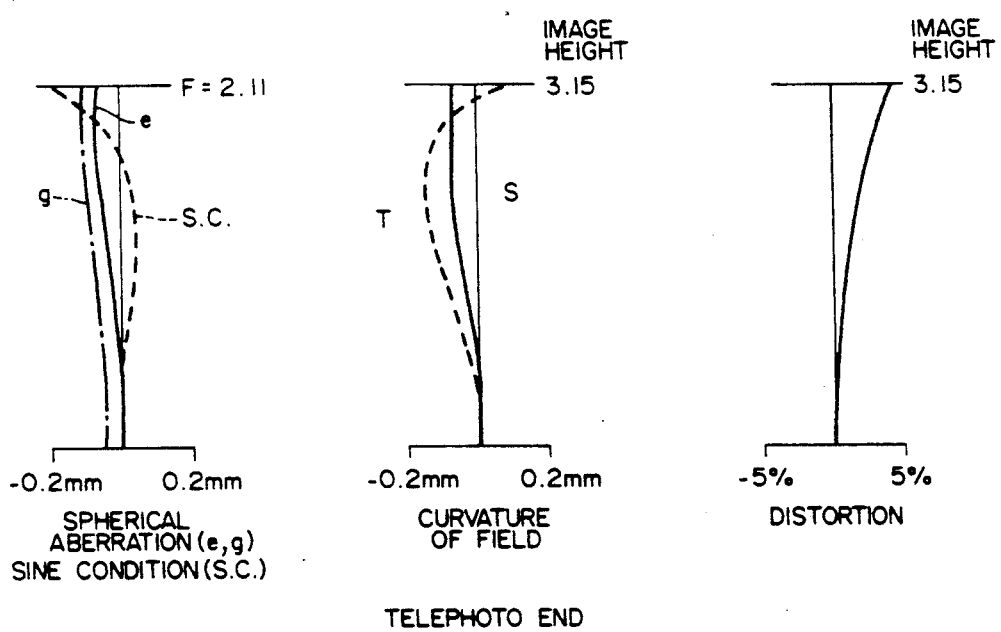

FIGS. 8A to 8C show aberration curves, such as spherical aberrations, curvature of field and distortion, of the zoom lens set forth in Table III at the wide-angle end (W), the intermediate point (M) and telephoto end (T), respectively. In FIGS. 8A to 8C, characters e, g, S, and T indicate, respectively, a spectrum line e, a spectrum line g, a sagittal surface and a tangential surface.

EXAMPLE IV

In the second example shown in FIG. 9, the zoom lens, set forth in Table IV, has a similar structure to that shown in FIG. 7, excepting that an aspherical surface is formed on a lens element L7 of the third lens group G3 which is made of glass and third lens element L10 of the fourth lens group G4 which is made of plastic and that the aperture means S is disposed on the subject side of the third lens group G3.

TABLE IV

| Lens | Lens Surface | Surface Radius (mm) | Axial Distance Between Surfaces (mm) | Nd | Vd |
|---|---|---|---|---|---|
| | r1 | 28.015 | | | |
| L1 | | | 1.20 | 1.84666 | 23.9 |
| | r2 | 19.500 | | | |
| L2 | | | 5.00 | 1.48749 | 70.4 |
| | r3 | −142.610 | | | |
| | | | 0.07 | | |
| | r4 | 19.504 | | | |
| L3 | | | 3.40 | 1.51633 | 64.1 |
| | r5 | 51.902 | | | |
| | | | W/0.60-M/9.31-T/17.50 | | |
| | r6 | 39.908 | | | |
| L4 | | | 0.72 | 1.83400 | 37.2 |
| | r7 | 7.818 | | | |
| | | | 1.99 | | |
| | r8 | −11.201 | | | |
| L5 | | | 0.72 | 1.77250 | 49.6 |
| | r9 | 6.739 | | | |
| L6 | | | 2.40 | 1.84666 | 23.9 |
| | r10 | 44.427 | | | |
| | | | W/12.12-M/4.70-T/1.20 | | |
| | r11 | 10.285 | | | |
| L7 | | | 2.50 | 1.43425 | 95.0 |
| | r12 | −37.291 | | | |
| | | | W/10.26-M/5.07-T/5.03 | | |
| | r13 | 8.229 | | | |
| L8 | | | 2.30 | 1.77250 | 49.6 |
| | r14 | 21.915 | | | |
| | | | 0.54 | | |
| | r15 | 294.360 | | | |
| L9 | | | 0.66 | 1.80518 | 25.5 |
| | r16 | 8.901 | | | |
| | | | 0.18 | | |
| | r17 | 10.131 | | | |
| L10 | | | 3.00 | 1.49230 | 57.6 |
| | r18 | −10.981 | | | |
| | | | W/1.00-M/1.00-T/1.00 | | |
| | r19 | Infinite | | | |
| L11 | | | 6.40 | 1.51633 | 64.1 |
| | r20 | Infinite | | | |

| ASPHERICAL COEFFICIENT | | |
|---|---|---|
| | Lens Surface: r11 | Lens Surface: r17 |
| C | 0.0972304 | 0.0987066 |
| K | 1.270048 | −0.301388 |
| A1 | 0.0 | 0.0 |
| A2 | $-1.90721 \times 10^{-4}$ | $-5.47835 \times 10^{-4}$ |
| A3 | $-1.78797 \times 10^{-6}$ | $-6.60585 \times 10^{-7}$ |
| A4 | $6.64139 \times 10^{-9}$ | $-1.97355 \times 10^{-8}$ |

FOCAL LENGTH DATA

TABLE IV-continued

| | Focal Length (mm) | Back Focal Length |
|---|---|---|
| Wide-Angle End (fw) | 6.186 | 4.455 |
| Intermediate (fi) | 16.826 | 8.351 |
| Telephoto end (ft) | 47.269 | 3.694 |

In the example IV, since the zoom lens has the third lens group G3 whose focal length f3 is 18.818 mm and the ratio of f3/fw is 3.042, the condition (3) is apparently cleared. The overall length of zoom lens system is 60.012 mm. The telephoto ratio of the zoom lens, which is defined by a ratio of the focal length of the telephoto end to the overall length, is 1.2696. It is to be noted that the axial distance between the lens surfaces r18 and r19 may be changed according to design demands.

Figure 10A:
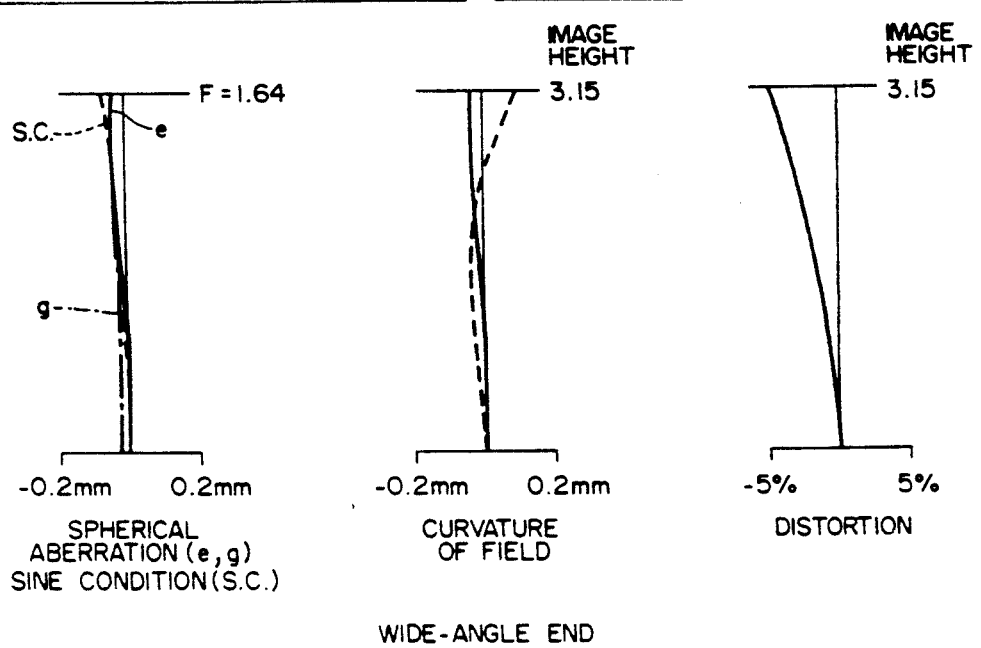
FIGS. 10A to 10C are graphs, similar to FIGS. 8A to 8C, of aberration curves of the zoom lens of FIG. 9.
Figure 10B:
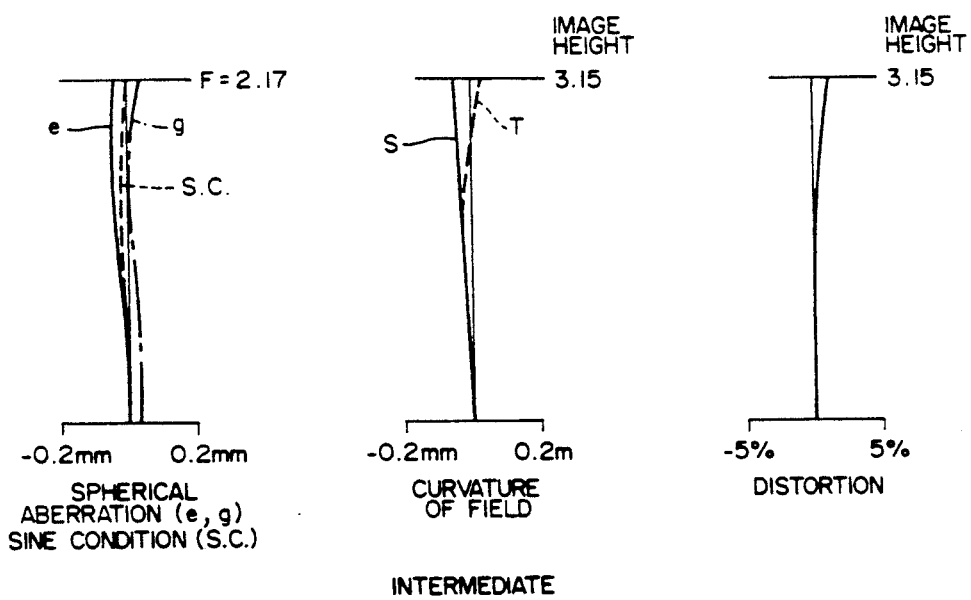
Figure 10C:
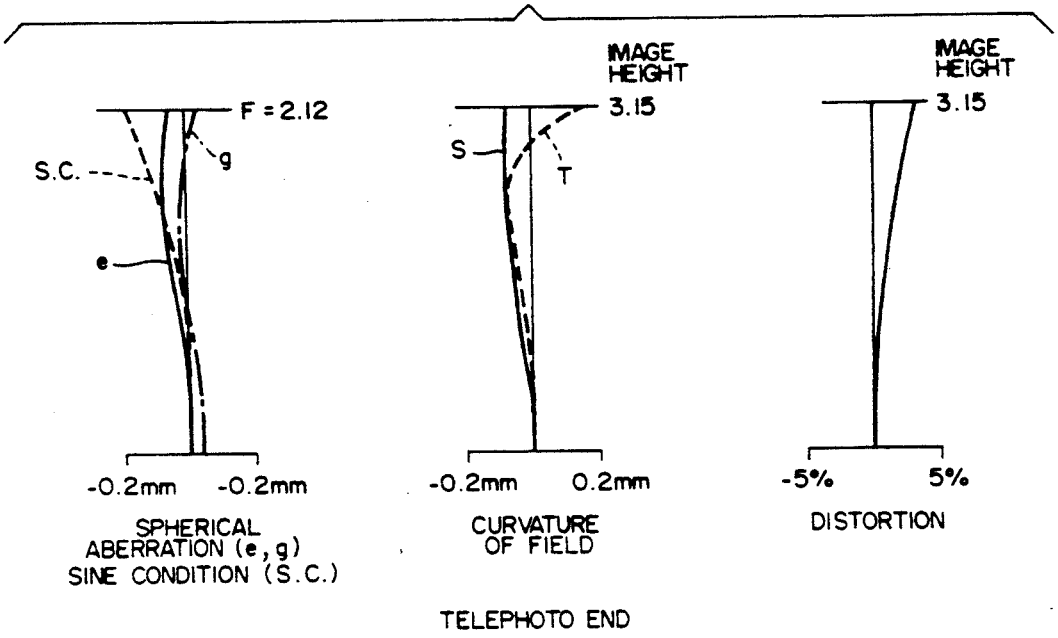

FIGS. 10A to 10C show aberration curves, such as spherical aberrations, curvature of field and distortion, of the zoom lens set forth in Table IV at the wide-angle end (W), the intermediate point (M) and telephoto end (T), respectively. In FIGS. 10A to 10C, characters e, g, S, and T indicate, respectively, a spectrum line e, a spectrum line g, a sagittal surface and a tangential surface.

It is to be understood that although the present invention has been described, in detail, with respect to preferred embodiments thereof, various other embodiments and variants are possible which fall in the scope and spirit of the invention, and such other embodiments and variants are intended to be covered by the following claims.

What is claimed is:

1. A zoom lens comprising in order from the object end a positive power of first lens means which remains stationary during zooming, a negative power of second lens means movable along an optical axis of the zoom lens between a wide-angle end where the zoom lens has a shortest focal length and a telephoto end where the zoom lens has a longest focal length for zooming, a positive power of third lens means and a positive power of fourth lens means both of which are movable along the optical axis during zooming, so that as said second negative lens means moves from said wide-angle end to said telephoto end for zooming, the third and fourth lens means are moved so as to initially decrease a relative axial distance between the third and fourth positive lens means and subsequently increase the axial distance while the second negative lens means moves, thereby correcting a change in focus caused by the second negative lens means during zooming.

2. A zoom lens as recited in claim 1, and further comprising a low-pass filter disposed stationary after said fourth positive lens means.

3. A zoom lens as recited in claim 1, wherein said third lens initially moves toward the image end and subsequently moves towards the object end.

4. A zoom lens as recited in claim 3, wherein said third lens means occupies the same axial position at said telephoto end as at said wide-angle end when said zoom lens is focused at infinity.

5. A zoom lens as recited in claim 4, wherein said fourth lens means moves in an axial direction opposite to an axial direction in which said third lens means moves.

6. A zoom lens as recited in claim 1, wherein said first lens means comprises in order from the object end a negative meniscus lens element convex to the object end, a positive bi-convex lens element and a positive meniscus lens element convex to the object end.

7. A zoom lens as recited in claim 6, wherein said negative meniscus lens element and said positive bi-convex lens element are cemented.

8. A zoom lens as recited in claim 6, wherein said second lens means comprises in order from the object end a negative meniscus lens element convex to the subject end, a negative bi-concave lens element and a positive lens element having a surface convex to the object end.

9. A zoom lens as recited in claim 8, wherein said negative bi concave lens element and said positive lens element are cemented.

10. A zoom lens as recited in claim 8, wherein said third lens means comprises a positive single lens element.

11. A zoom lens as recited in claim 10, wherein said positive single lens element has a surface convex to the object end.

12. A zoom lens as recited in claim 10, wherein said positive single lens element has an aspherical lens surface.

13. A zoom lens as recited in claim 10, wherein said fourth lens means comprises in order from the subject end a positive bi-convex lens element, a negative lens element having a surface concave to the image end and a positive bi-convex lens element.

14. A zoom lens as recited in claim 13, wherein said fourth lens means has at least one aspherical lens surface.

15. A zoom lens as recited in claim 14, wherein at least one of said positive bi-convex lens elements has an aspherical lens surface.

16. A zoom lens as recited in claim 2, further satisfying:

$$0.29 < |f2|/\sqrt{fw \times ft} < 0.44$$

where
f2 is the power of said second lens means; and
fw is the focal length of the zoom lens at said wide-angle end; and
ft is the focal length of the zoom lens at said telephoto end.

17. A zoom lens as recited in claim 16, further satisfying:

$$0.83 < f3/fw \times \sqrt{ZR} < 2.0$$

where
f3 is the power of said third lens means;
fw is the focal length of the zoom lens at said wide-angle end; and
ZR is the zoom ratio of the zoom lens.

18. A zoom lens as recited in claim 13, further defined substantially as follows:

| Lens | Lens Surface | Surface Radius (mm) | Axial Distance Between Surfaces (mm) | Ne |
|---|---|---|---|---|
| L1 | r1 | 44.263 | | |
| | | | 1.10 | 1.81264 |
| | r2 | 20.273 | | |
| L2 | | | 5.47 | 1.59143 |
| | r3 | −70.547 | | |
| | | | 0.20 | |

-continued

| Lens | Lens Surface | Surface Radius (mm) | Axial Distance Between Surfaces (mm) | Ne |
|---|---|---|---|---|
| L3 | r4 | 15.444 | | |
| | | | 3.36 | 1.59143 |
| | r5 | 44.457 | | |
| | | | M/0.50-T/12.50 | |
| L4 | r6 | 71.425 | | |
| | | | 0.72 | 1.83929 |
| | r7 | 6.965 | | |
| | | | 2.48 | |
| L5 | r8 | −8.291 | | |
| | | | 0.72 | 1.77620 |
| L6 | r9 | 6.279 | | |
| | | | 2.18 | 1.81264 |
| | r10 | −59.579 | | |
| | | | W/13.50-T/1.50 | |
| L7 | r11 | (Aspherical) | | |
| | | | 2.50 | 1.59143 |
| | r12 | −83.488 | | |
| | | | W/7.50-T/7.50 | |
| L8 | r13 | (Aspherical) | | |
| | | | 3.0 | 1.59143 |
| | r14 | −22.741 | | |
| | | | 0.50 | |
| L9 | r15 | 59.214 | | |
| | | | 0.72 | 1.81264 |
| | r16 | 8.386 | | |
| | | | 0.48 | |
| L10 | r17 | 10.911 | | |
| | | | 2.90 | 1.59143 |
| | r18 | −43.016 | | |
| | | | W/7.80-T/7.80 | |
| L11 | r19 | Infinite | | |
| | | | 6.40 | 1.51825 |
| | r20 | Infinite | | | where
L1-L11 are the lens elements in order from the subject end, r1-r20 are lens surfaces in order from the object end with positive radii struck from the right and negative radii struck from the left, and Ne identifies the index of refraction measured by an e-line spectrum.

19. A zoom lens as recited in claim 18, wherein said aspherical surface is defined as follows:

$$X = [CY^2/(1 + \sqrt{1 - KC^2Y^2})] + A1Y^2 + A2Y^4 + A3Y^6 + A4Y^8$$

| ASPHERICAL COEFFICIENT | | |
|---|---|---|
| | Lens Surface: r11 | Lens Surface: r13 |
| C | $6.817097 \times 10^{-2}$ | $9.048955 \times 10^{-2}$ |
| K | $9.387801 \times 10^{-1}$ | $-1.02458$ |
| A1 | 0.0 | 0.0 |
| A2 | $-6.941958 \times 10^{-5}$ | $-6.088017 \times 10^{-6}$ |
| A3 | $-1.590088 \times 10^{-6}$ | $-1.647785 \times 10^{-8}$ |
| A4 | $7.273377 \times 10^{-9}$ | $3.198951 \times 10^{-12}$ | where
X is the axial distance;
Y is the height from the axis;
A1-A4 are aspherical coefficients;
C is the reciprocal of a radius of paraxial surface; and
K is an eccentricity.

20. A zoom lens as recited in claim 13, further defined substantially as follows:

| Lens | Lens Surface | Surface Radius (mm) | Axial Distance Between Surfaces (mm) | Ne |
|---|---|---|---|---|
| L1 | r1 | 41.616 | | |
| | | | 1.10 | 1.81264 |
| L2 | r2 | 19.942 | | |
| | | | 5.52 | 1.59143 |
| | r3 | −73.124 | | |
| | | | 0.20 | |
| L3 | r4 | 15.998 | | |
| | | | 3.26 | 1.59143 |
| | r5 | 47.910 | | |
| | | | W/0.50-T/12.50 | |
| L4 | r6 | 71.416 | | |
| | | | 0.72 | 1.83929 |
| | r7 | 7.072 | | |
| | | | 2.38 | |
| L5 | r8 | −8.842 | | |
| | | | 0.72 | 1.77620 |
| L6 | r9 | 5.910 | | |
| | | | 2.22 | 1.81264 |
| | r10 | −134.696 | | |
| | | | W/13.50-T/1.50 | |
| L7 | r11 | (Aspherical) | | |
| | | | 2.50 | 1.59143 |
| | r12 | Infinite | | |
| | | | W/7.50-T/7.50 | |
| L8 | r13 | 9.862 | | |
| | | | 3.0 | 1.67341 |
| | r14 | −20.847 | | |
| | | | 0.50 | |
| L9 | r15 | −19.857 | | |
| | | | 0.72 | 1.81264 |
| | r16 | 10.744 | | |
| | | | 0.48 | |
| L10 | r17 | (Aspherical) | | |
| | | | 2.90 | 1.59143 |
| | r18 | −17.061 | | |
| | | | W/7.80-T/7.80 | |
| L11 | r19 | Infinite | | |
| | | | 6.40 | 1.51825 |
| | r20 | Infinite | | | where
L1-L11 are the lens elements in order from the subject end, r1-r20 are lens surfaces in order from the object end with positive radii struck from the right and negative radii struck from the left, and Ne identifies the index of refraction measured by an e-line spectrum.

21. A zoom lens as recited in claim 20, wherein said aspherical surface is defined as follows:

$$X = [CY2^2/(1 + \sqrt{1 - KC^2Y^2})] + A1Y^2 + A2Y^4 + A3Y^6 + A4Y^8$$

| ASPHERICAL COEFFICIENT | | |
|---|---|---|
| | 11th Lens Surface | 17th Lens Surface |
| C | $7.904201 \times 10^{-2}$ | $8.061396 \times 10^{-2}$ |
| K | 1.065024 | $7.464477 \times 10^{-1}$ |
| A1 | 0.0 | 0.0 |
| A2 | $-8.679398 \times 10^{-5}$ | $-3.876448 \times 10^{-4}$ |
| A3 | $-1.563098 \times 10^{-7}$ | $-1.517197 \times 10^{-7}$ |
| A4 | $7.274023 \times 10^{-9}$ | $-2.053923 \times 10^{-8}$ | where
X is the axial distance;
Y is the height from the axis;
A1-A4 are aspherical coefficients;
C is the reciprocal of a radius of paraxial surface; and
K is an eccentricity.

22. A zoom lens comprising in order from the subject end a positive power of first lens means movable along an optical axis of the zoom lens for focusing but remaining stationary during zooming, a negative power of second lens means, a positive power of third lens means, a positive power of fourth lens means, a low-pass filter disposed stationary after said fourth lens means and aperture means disposed closely to said third lens means between said second and fourth leans means, said second to fourth lens means being moved relatively to one another along said optical axis for zooming between a wide-angle end where the zoom lens has a shortest focal length and a telephoto end where the zoom lens has a longest focal length so as to decreasingly change an axial distance between said second and third lens means during a zooming from said wide angle end to said telephoto end, and said aperture means being moved along said optical axis in the same axial direction and distance as the third positive lens means during zooming.

23. A zoom lens as recited in claim 22, wherein said aperture means is disposed after said third lens means.

24. A zoom lens as recited in claim 23, wherein said aperture means is disposed before said third lens means.

25. A zoom lens as recited in claim 23, wherein said first lens means comprises, in order from the subject end, a negative meniscus lens element convex to the subject end, a positive bi-convex lens element and a positive meniscus lens element convex to the subject end.

26. A zoom lens as recited in claim 25, wherein said negative meniscus lens element and said positive bi-convex lens element are cemented.

27. A zoom lens as recited in claim 25, wherein said second negative lens means comprises, in order from the subject end, a negative meniscus lens element convex to the object end, a negative bi-concave lens element and a positive lens element having a surface convex to the object end.

28. A zoom lens as recited in claim 27, wherein said negative bi-concave lens element and said positive lens element are cemented.

29. A zoom lens as recited in claim 27, wherein said third positive lens means consists of a positive single lens element.

30. A zoom lens as recited in claim 29, wherein said positive single lens element has a surface convex to the object end.

31. A zoom lens as recited in claim 29, wherein said positive single lens element has an aspherical lens surface.

32. A zoom lens as recited in claim 29, wherein said fourth positive lens means comprises, in order from the subject end, a positive meniscus lens element, a negative lens element having a surface concave to the image end and a positive bi-convex lens element.

33. A zoom lens as recited in claim 32, wherein said fourth positive lens means has at least one aspherical lens surface.

34. A zoom lens as recited in claim 32, wherein said positive meniscus lens element has an aspherical lens surface.

35. A zoom lens as recited in claim 34, further satisfying:

$$2.5 < f3/fw < 4.5$$

where
f3 is the power of said third lens means; and
fw is the shortest focal length of the zoom lens.

36. A zoom lens as recited in claim 35, further defined substantially as follows:

| Lens | Lens Surface | Surface Radius (mm) | Axial Distance Between Surfaces (mm) | Nd | Vd |
|---|---|---|---|---|---|
| L1 | r1 | 29.053 | | | |
| | | | 1.20 | 1.84666 | 23.9 |
| | r2 | 19.787 | | | |
| L2 | | | 5.00 | 1.48749 | 70.4 |
| | r3 | −108.170 | | | |
| | | | 0.07 | | |
| | r4 | 18.355 | | | |
| L3 | | | 3.60 | 1.48749 | 70.4 |
| | r5 | 51.330 | | | |
| | | | W/0.48-M/9.19-T/16.59 | | |
| | r6 | 54.638 | | | |
| L4 | | | 0.72 | 1.71300 | 53.9 |
| | r7 | 7.779 | | | |
| | | | 1.90 | | |
| | r8 | −12.623 | | | |
| L5 | | | 0.72 | 1.75896 | 50.4 |
| | r9 | 5.489 | | | |
| L6 | | | 1.80 | 1.80518 | 25.5 |
| | r10 | 23.536 | | | |
| | | | W/10.96-M/5.93-T/1.20 | | |
| | r11 | Aspherical | | | |
| L7 | | | 2.04 | 1.51823 | 59.0 |
| | r12 | −66.166 | | | |
| | | | W/11.69-M/5.58-T/6.25 | | |
| | r13 | Aspherical | | | |
| L8 | | | 3.60 | 1.48749 | 70.4 |
| | r14 | 43.943 | | | |
| | | | 0.06 | | |
| | r15 | 10.366 | | | |
| L9 | | | 0.66 | 1.84666 | 23.9 |
| | r16 | 5.269 | | | |
| | | | 0.94 | | |
| | r17 | 10.629 | | | |
| L10 | | | 2.40 | 1.77250 | 49.6 |
| | r18 | −155.680 | | | |
| | | | W/1.00-M/1.00-T/1.00 | | |
| | r19 | Infinite | | | |
| L11 | | | 6.40 | 1.51633 | 64.1 |
| | r20 | Infinite | | | | where
L1-L11 are lens elements in order from the subject end, r1- r20 are lens surfaces in order from the object end with positive radii struck from the right and negative radii struck from the left, and Nd and Vd, respectively, identify the index of refraction measured by a d-line spectrum and Abbe Number.

37. A zoom lens as recited in claim 36, wherein said aspherical surface is defined as follows:

$$X = [CY^2/(1 + \sqrt{1 - KC^2Y^2})] + A1Y^2 + A2Y^4 + A3Y^6 + A4Y^8$$

| ASPHERICAL COEFFICIENT | | |
|---|---|---|
| | Lens Surface: r11 | Lens Surface: r13 |
| C | 0.064346 | 0.166794 |
| K | 0.994157 | 0.339525 |
| A1 | 0.0 | 0.0 |
| A2 | −9.8228 × 10$^{-5}$ | 1.08899 × 10$^{-4}$ |
| A3 | −5.3973 × 10$^{-7}$ | 4.53960 × 10$^{-6}$ |
| A4 | −7.1375 × 10$^{-10}$ | −1.08032 × 10$^{-8}$ | where
X is the axial distance;
Y is the height from the axis;
A1-A4 are aspherical coefficients;
C is the reciprocal of a radius of paraxial surface; and
K is an eccentricity.

38. A zoom lens as recited in claim 35, further defined substantially as follows:

| Lens | Lens Surface | Surface Radius (mm) | Axial Distance Between Surfaces (mm) | Nd | Vd |
|---|---|---|---|---|---|
| L1 | r1 | 28.015 | | | |
| | | | 1.20 | 1.84666 | 23.9 |
| | r2 | 19.500 | | | |
| L2 | | | 5.00 | 1.48749 | 70.4 |
| | r3 | −142.610 | | | |
| | | | 0.07 | | |
| | r4 | 19.504 | | | |
| L3 | | | 3.40 | 1.51633 | 64.1 |
| | r5 | 51.902 | | | |
| | | | W/0.60-T/17.50 | | |
| | r6 | 39.908 | | | |
| L4 | | | 0.72 | 1.83400 | 37.2 |
| | r7 | 7.818 | | | |
| | | | 1.99 | | |
| | r8 | −11.201 | | | |
| L5 | | | 0.72 | 1.77250 | 49.6 |
| | r9 | 6.739 | | | |
| L6 | | | 2.40 | 1.84666 | 23.9 |
| | r10 | 44.427 | | | |
| | | | W/12.12-T/1.20 | | |
| | r11 | (Aspherical) | | | |
| L7 | | | 2.50 | 1.43425 | 95.0 |
| | r12 | −37.291 | | | |
| | | | W/10.26-T/5.03 | | |
| | r13 | 8.229 | | | |
| L8 | | | 2.30 | 1.77250 | 49.6 |
| | r14 | 21.915 | | | |
| | | | 0.54 | | |
| | r15 | 294.360 | | | |
| L9 | | | 0.66 | 1.80518 | 25.5 |
| | r16 | 8.901 | | | |
| | | | 0.18 | | |
| | r17 | (Aspherical) | | | |
| L10 | | | 3.00 | 1.49230 | 57.6 |
| | r18 | −10.981 | | | |
| | | | W/1.00-T/1.00 | | |
| | r19 | Infinite | | | |
| L11 | | | 6.40 | 1.51633 | 64.1 |
| | r20 | Infinite | | | | where
L1–L11 are lens elements in order from the subject end, r1–r20 are lens surfaces in order from the object end with positive radii struck from the right and negative radii struck from the left, and Nd and Vd, respectively, identify the index of refraction measured by a d-line spectrum and Abbe Number.

39. A zoom lens as recited in claim 38, wherein said aspherical surface is defined as follows:

$$X = [CY^2/(1 + \sqrt{1 - KC^2Y^2})] + A1Y^2 + A2Y^4 + A3Y^6 + A4Y^8$$

| ASPHERICAL COEFFICIENT | | |
|---|---|---|
| | Lens Surface: r11 | Lens Surface: r17 |
| C | 0.0972304 | 0.0987066 |
| K | 1.270048 | −0.301388 |
| A1 | 0.0 | 0.0 |
| A2 | −1.90721 × 10$^{-4}$ | −5.47835 × 10$^{-4}$ |
| A3 | −1.78797 × 10$^{-6}$ | −6.60585 × 10$^{-7}$ |
| A4 | 6.64139 × 10$^{-9}$ | −1.97355 × 10$^{-8}$ | where
X is the axial distance;
Y is the height from the axis;
A1–A4 are aspherical coefficients;
C is the reciprocal of a radius of paraxial surface; and
K is an eccentricity.

40. A zoom lens comprising in order from the subject end a positive power of first lens means, a negative power of second lens means, a positive power of third lens means, a positive power of fourth lens means, and aperture means disposed closely to said third lens means between said second and fourth lens means, said fourth lens means being moved along the optical axis of said zoom lens for focusing, said second to fourth lens means being moved relatively to one another, while the first lens means remains stationary, during zooming in such a way that third to fourth lens means being moved relatively to one another along said optical axis for zooming between a wide-angle end where the zoom lens has a shortest focal length and a telephoto end where the zoom lens has a longest focal length so as to decreasingly change an axial distance between said second and third lens means during a zooming from said wide-angle end to said telephoto end, and said aperture means being moved along said optical axis in the same axial direction and distance as the third positive lens means during zooming.

* * * * *